United States Patent
Schnabel

(10) Patent No.: US 9,353,841 B2
(45) Date of Patent: May 31, 2016

(54) DRIVE DEVICE FOR A SELF-PROPELLED MACHINE AND CORRESPONDING METHOD

(75) Inventor: Bernhard Schnabel, Starnberg (DE)

(73) Assignee: NAF NEUNKIRCHENER ACHSENFABRIK AG, Neunkirchen (DE)

( * ) Notice: Subject to any disclaimer, the term of this patent is extended or adjusted under 35 U.S.C. 154(b) by 90 days.

(21) Appl. No.: 13/985,628

(22) PCT Filed: Mar. 16, 2012

(86) PCT No.: PCT/EP2012/054668
§ 371 (c)(1),
(2), (4) Date: Aug. 15, 2013

(87) PCT Pub. No.: WO2012/130639
PCT Pub. Date: Oct. 4, 2012

(65) Prior Publication Data
US 2014/0007739 A1    Jan. 9, 2014

(30) Foreign Application Priority Data
Mar. 25, 2011   (EP) .................................. 11159860

(51) Int. Cl.
| | | |
|---|---|---|
| *F16H 37/06* | (2006.01) | |
| *F16H 47/02* | (2006.01) | |
| *F16H 61/30* | (2006.01) | |
| *F15B 15/14* | (2006.01) | |

(52) U.S. Cl.
CPC .............. *F16H 37/065* (2013.01); *F16H 47/02* (2013.01); *F16H 61/30* (2013.01); *F15B 15/1409* (2013.01); *F16H 2047/025* (2013.01); *F16H 2061/307* (2013.01); *Y10T 74/19014* (2015.01)

(58) Field of Classification Search
CPC ................... Y10T 74/19014; F16H 2061/307; F16H 61/30; F16H 2047/025; F16H 47/02; F16H 37/065; F15B 15/1409
USPC .................................. 74/661, 730.1, 718, 721
See application file for complete search history.

(56) References Cited

U.S. PATENT DOCUMENTS

| | | | | |
|---|---|---|---|---|
| 5,943,918 A | * | 8/1999 | Reed et al. ...................... | 74/661 |
| 8,070,649 B2 | * | 12/2011 | Holmes ............................ | 477/5 |
| 8,337,359 B2 | * | 12/2012 | Hofbauer ......................... | 477/5 |
| 8,757,018 B2 | * | 6/2014 | Gaully ............................ | 74/325 |

(Continued)

FOREIGN PATENT DOCUMENTS

| | | |
|---|---|---|
| CN | 1950630 A | 4/2007 |
| DE | 202004009821 U1 | 9/2004 |

(Continued)

*Primary Examiner* — William Kelleher
*Assistant Examiner* — Zakaria Elahmadi
(74) *Attorney, Agent, or Firm* — Barlow, Josephs & Holmes, Ltd.

(57) ABSTRACT

The invention relates to a drive device (10) for an automotive work machine, wherein the drive device (10) includes a first hydraulic motor (12a) coupled to a driven shaft (16), a second hydraulic motor (12b) and a coupling device (18), by means of which the second hydraulic motor (12b) can be coupled to the driven shaft (16) for torque addition in a first shift state, and can be decoupled from the driven shaft (16) in a second shift state. The coupling device (18) in turn includes at least one synchronizing body (20) with a conical friction surface (22) coupled to the second hydraulic motor (12b) and a gear wheel (24) with a corresponding friction surface (26) movable relatively to the synchronizing body (20) and coupled to the driven shaft (16).

13 Claims, 2 Drawing Sheets

(56) References Cited

U.S. PATENT DOCUMENTS

| | | | |
|---|---|---|---|
| 2010/0132492 A1* | 6/2010 | Holmes | 74/331 |
| 2013/0152732 A1* | 6/2013 | Klingston et al. | 74/661 |
| 2013/0186233 A1* | 7/2013 | Kaltenbach | 74/661 |
| 2014/0083246 A1* | 3/2014 | Venturi | 74/661 |

FOREIGN PATENT DOCUMENTS

| | | |
|---|---|---|
| EP | 1600666 A1 | 11/2005 |
| EP | 2202413 A1 | 6/2010 |
| RU | 2052362 C1 | 1/1996 |
| RU | 2096672 C1 | 11/1997 |

\* cited by examiner

DRIVE DEVICE FOR A SELF-PROPELLED MACHINE AND CORRESPONDING METHOD

BACKGROUND OF THE INVENTION

The invention relates to a drive device of the type specified in the preamble of claim 1 for an automotive work machine. The invention further relates to an automotive work machine with a drive device as well as to a method for operating a drive device of an automotive work machine.

Conventional drive devices for mobile work machines are driven by hydraulic motors. However, the operating range of a hydraulic motor usually does not allow covering the entire drive range of the work machines from maximum traction force at small speeds up to the maximum traveling speed. Therefore, conventional drive devices have two shift states, the first shift state of which with greater gear ratio is adapted for slow speeds and large traction forces and the second shift state of which with lower gear ratio is adapted for fast speeds and lower traction forces. Therein, a hydraulic motor usually remains permanently engaged with constant gear ratio and covers the entire speed range with low traction force. A second hydraulic motor is connected for torque addition with greater gear ratio in order to allow large traction forces at small speeds. Due to the greater gear ratio, however, the second hydraulic motor reaches its rotation speed limit already at relatively low speed and therefore has to be decoupled at larger speeds. However, the change of the shift states is only possible in standstill in many drive devices.

Various concepts exist in order to allow passing through the entire speed range without interruption of the traction force. For example, from DE 44 04 829 A1, a drive device can be gathered, which includes a superposition transmission, two hydraulic motors and several multi-disk clutches among other things. In order to change the gear ratio during travel, with which the second hydraulic motor is connected, the coupling of the second hydraulic motor is changed over from a sun gear shaft to a ring gear of a planetary gearing. This allows that the work machine can pass through the entire speed range without interruption of the traction force, because a hydraulic motor remains permanently connected and thereby provides a torque even during the shifting operation.

However, the circumstance is to be considered disadvantageous in such a drive device that both hydraulic motors have to obtain an own hydraulic drive determined by the system. Thus, at least two pumping devices are always required for the traction drive. Moreover, multiple multi-disk clutches, multiple rotary feedthroughs and a pumping device are required in order to keep the pressure constant on the multi-disk clutches. This results in a correspondingly high installation space requirement of the drive device as well as in high manufacturing costs.

In addition, drive devices are known, in which one of two hydraulic motors is engaged and disengaged with a multi-disk clutch. However, the multi-disk clutch has to be configured such that it is able to securely transmit the full torque of the hydraulic motor. In addition, in these concepts, the multi-disk clutch is usually disposed on a center shaft in order to avoid too high rotation speeds at large speeds on the then disengaged drive branch, whereby the torque maximally to be transmitted becomes even larger. Here too, a separate pumping device is therefore required in order to be able to provide a sufficient pressure for the multi-disk clutch on all operating conditions. Alternatively, the clutch is fed by the feed pressure of the hydrostatic traction drive available anyway. However, this feed pressure can usually vary by the factor of 3, for example between about 10 bar and about 30 bar, such that the friction power on the multi-disk clutch also considerably varies. Therefore, the multi-disk clutch has to be capable of transmitting the required torque even with comparatively low feed pressure. However, this requires a comparatively large dimensioning of the multi-disk clutch, whereby the installation space requirement and the manufacturing costs of the drive device in turn significantly increase.

BRIEF SUMMARY OF THE INVENTION

It is the object of the present invention to provide a drive device of the initially mentioned type, which has a low installation space requirement and is more inexpensively manufacturable. A further object of the invention is to provide a corresponding method for operating such a drive device of an automotive work machine.

According to the invention, the objects are solved by a drive device having the features of claim 1, a work machine according to claim 11 as well as by a method according to claim 12 for operating a drive device of an automotive work machine. Advantageous developments with convenient further developments of the invention are specified in the respective dependent claims, wherein advantageous developments of the drive device are to be considered as advantageous developments of the method and vice versa.

A drive device according to the invention for an automotive work machine includes a first hydraulic motor coupled to a driven shaft, a second hydraulic motor and a coupling device, by means of which the second hydraulic motor can be coupled to the driven shaft for torque addition in a first shift state and can be decoupled from the driven shaft in a second shift state. Therein, the coupling device includes at least one synchronizing body with a conical friction surface coupled to the second hydraulic motor and a gear wheel with a corresponding friction surface movable relatively to the synchronizing body and coupled to the driven shaft, wherein upon coupling the second hydraulic motor to the driven shaft, a possible rotation speed difference between the synchronizing body and the gear wheel is at least reducible and a frictional fit between the friction surface of the synchronizing body and the friction surface of the gear wheel can be established by relatively moving the synchronizing body and the friction surface of the gear wheel to each other. Upon decoupling the second hydraulic motor from the driven shaft, the frictional fit between the friction surface of the synchronizing body and the friction surface of the gear wheel can be cancelled by relatively moving the synchronizing body and the gear wheel away from each other. In other words, according to the invention, it is provided that the coupling device includes a hydraulic motor side synchronizing body and a gear wheel coupled to the driven shaft unlike the prior art, which are moved towards each other upon coupling the second hydraulic motor to the driven shaft, that is upon shifting the coupling device from the second into the first shift state such that an at least indirect frictional fit between the friction surfaces of the synchronizing body and the gear wheel is established and the torque of the second hydraulic motor is hereby added to the torque of the first hydraulic motor. Basically, therein, it can of course also be provided that the gear wheel is disposed on the hydraulic motor side in terms of kinematic reversal and the synchronizing body is coupled to the driven shaft. Due to the omission of costly and expensive multi-disk clutches, planetary gearings or the like, the drive device according to the invention can therefore be formed in constructively particularly simple and installation space saving manner and be correspondingly inexpensively manufactured. The stronger the friction surface of the synchronizing body is therein moved to the friction surface of the gear wheel, the higher the friction forces between the two friction surfaces become due to the conical configuration. Accordingly, possible rotation speed differences between the synchronizing body and the gear wheel can also be at least reduced or completely compensated for at the latest upon effected frictional fit depending on the friction forces. By a larger actuation force, thus, a correspondingly faster synchronization of the rotation speeds can be achieved and a possibly existing rotation speed difference between the second hydraulic motor coupled to the synchronizing body and the rotating gear wheel can be compensated for upon establishing the frictional fit. Therein, the second hydraulic motor is preferably engaged in the drive train with a larger gear ratio than the first hydraulic motor. In reverse, the frictional fit can be cancelled according to the invention upon decoupling the second hydraulic motor from the driven shaft, that is upon shifting the coupling device from the first into the second shift state, wherein possible rotation speed differences between the synchronizing body and the gear wheel are insignificant due to the decoupling. If the second hydraulic motor is coupled in with a larger gear ratio, the decoupling can be conveniently effected upon exceeding a preset speed limit. Therein, it can be basically provided that the changeover between the shift states of the drive device is to be performed manually, automated and/or automatically.

In an advantageous development of the invention, it is provided that the synchronizing body and the gear wheel include toothings corresponding with each other, wherein the toothings are engaged with each other at least with the second hydraulic motor coupled to the driven shaft. In other words, it is provided that the synchronizing body and the gear wheel are additionally coupled to each other via a form-fit connection at least with established frictional fit in the first shift state of the coupling device. Hereby, particularly high torques of the second hydraulic motor can be reliably transmitted. The toothing can for example be formed as a so-called pre-toothing on the synchronizing body and/or gear wheel. A further advantage is in that the friction surfaces of the synchronizing body and the gear wheel are predominantly only required for short-time compensation for possible rotation speed differences. Therefore, the synchronizing body and the gear wheel can be particularly compactly designed. Thus, the advantages of a conventional toothing (form-fit connection, independent of pressure) are combined with those of a multi-disk clutch (engaging/disengaging even under load).

In a further advantageous development of the invention, it is provided that the coupling device is formed such that intermeshing of the toothings upon exceeding a preset rotation speed difference between the synchronizing body and the gear wheel is made impossible. In other words, it is provided that the coupling device has a locking synchronization such that first an at least approximate synchronism of the synchronizing body and the gear wheel has to be present before the toothings can be engaged with each other. As long as this at least approximate synchronism is not achieved, the engagement of the toothings with each other is blocked. Hereby, the involved components are mechanically preserved and the lifetime of the coupling device is advantageously increased.

Further advantages arise if the toothings are formed as a claw toothing, in particular with undercut teeth. In this manner, it is ensured that the coupling device is reliably maintained in the first shift state and the coupling between second hydraulic motor and driven shaft is reliably maintained even under high load. Moreover, unlike a multi-disk clutch, a toothing formed as a claw toothing ensures that the synchronizing body and the gear wheel are still maintained in their current position to each other in case of sudden pressure loss or upon undesired cancelation of the frictional fit. Therefore, the actuation of the coupling device can advantageously and securely be effected with the aid of the feed pressure of the hydraulic motors required anyway, whereby the drive device can be particularly compactly and inexpensively formed.

In a further advantageous development of the invention, it is provided that the coupling device includes a shift cylinder, by means of which the synchronizing body and the gear wheel are movable relatively to each other. Hereby, simple shifting of the coupling device between the first and second shift state is allowed. Therein, the shift cylinder is adapted to move the synchronizing body relative to the gear wheel. Basically, the shift cylinder can be mechanically, electrically, pneumatically, magnetically and/or hydraulically operable.

In further development of the invention, it has proven advantageous if the shift cylinder includes a cylinder element having a working space, a first and a second piston received in the working space displaceable relative to it, by which the working space is divided in a first working chamber being able to be loaded with a working medium via a first connection of the shift cylinder, a second working chamber being able to be loaded with a working medium via a second connection of the shift cylinder, and a third working chamber disposed between the first and the second working chamber, and at least one spring element being able to be supported on the first piston on the one hand and on the second piston on the other hand, by means of which the pistons can be mutually loaded with force. Furthermore, it is provided that a first stop of the shift cylinder is associated with the first piston, by means of which movement of the first piston towards the second piston is limited, and that a second stop of the shift cylinder is associated with the second piston, by means of which movement of the second piston towards the first piston is limited.

By loading the first and/or the second piston with the corresponding working medium and thereby with the corresponding pressure, the pistons can be displaced in the working space relative to it, which is associated with volume increase or volume decrease of the first and the second working chamber, respectively. Moreover, the shift cylinder includes at least one spring element, in particular a compression spring, which can be supported on the first piston on the one hand and on the second piston on the other hand. Therein, the spring element is for example disposed in the third working chamber. Thus, the pistons are spaced from each other via the spring element. As a result of supportability of the spring element on the pistons, the spring element can be stressed by moving the pistons relatively to each other, in particular towards each other. By means of the spring element, the pistons can be mutually loaded with force.

As already mentioned, a first stop of the shift cylinder is associated with the first piston, by means of which movement of the first piston towards the second piston is limited. If the first working chamber is loaded with the working medium, which is associated with the pressurization of the first piston, thus, the first piston is moved towards the second piston. Therein, the first piston is moved towards the second piston or can be moved over such a movement path until the first piston comes into supporting abutment on the first stop associated with it as a result of the pressurization. If the first piston is moved into supporting abutment on the first stop, thus, the first piston can no longer be further moved towards the second piston, even if the first piston is further pressurized via the working medium.

A second stop of the shift cylinder is also associated with the second piston, by means of which movement of the second piston towards the first piston is limited. If for example the second working chamber is loaded with the working medium, whereby the second piston is pressurized, thus, movement of the second piston towards the first piston is effected thereby. Now, the second piston moves as long as or over such a movement path towards the first piston until the second piston comes into supporting abutment on the second stop associated with it. If the second piston is moved into supporting abutment on the second stop, thus, the second piston cannot be further moved towards the first piston, even if the second piston is further pressurized via the working medium.

The shift cylinder, via which the coupling device can be shifted between the first and the second shift state, has a particularly low number of parts and thereby a particularly low complexity. This is associated with low installation space requirement, low weight as well as low costs.

Moreover, the shift cylinder allows particularly secure shifting of the coupling device and thereby particularly secure coupling and decoupling of the second hydraulic motor since sudden termination of the pressurization of the first or the second piston via the corresponding working medium does not result in undesired movement of the first piston or the second piston in the working space relative to the cylinder element. Thereby, undesired shifting of the coupling device and thereby undesired coupling of the desirably decoupled second hydraulic motor or undesired decoupling of the desirably coupled second hydraulic motor is reliably avoided in all operating situations. Thereby, undesired damage to the coupling device and/or the hydraulic motors as a result of undesired shifting of the coupling device is also prevented.

For moving the second piston towards the first piston, it is provided that a second force acting on the second piston, which results from the loading of the second piston with the working medium and thereby from a second pressure of the working medium in the second working chamber, is greater than a spring force counteracting the second force and acting on the second piston as a result of the support of the spring element on the second piston on the one hand and on the first piston on the other hand. Therein, the second force and the spring force are greater than a first force acting on the first piston, which optionally acts from the pressurization of the first piston with the working medium of the first working chamber and thus from the pressure of the working medium in the first working chamber opposite to the first force.

For moving the first piston towards the second piston, force relationships inverse thereto are provided. Therein, the first force acting on the first piston as a result of pressurization of the first piston with the working medium in the first working chamber is greater than the spring force of the spring element, which acts on the first piston as a result of the support or supportability of the spring element on the first piston on the one and on the second piston on the other hand, and which is directed opposite to the first force. The first force and the spring force are therein greater than the second force optionally acting on the second piston as a result of the pressurization of the second piston and opposite to the first force.

Advantageously, in moving the second piston towards the first piston, the first force and thereby the pressure in the first working chamber is at least substantially zero. In very advantageous manner, for moving the first piston towards the second piston, the second force and thereby the pressure in the second working chamber is at least substantially zero.

If the first chamber is loaded with working medium, which is associated with a pressurization of the first piston, and if sudden pressure loss in the first working chamber occurs such that the first piston is loaded with a lower pressure or no longer loaded with pressure, thus, this sudden pressure loss does not cause sudden undesired movement of the first piston within the working space. Therefore, the first piston remains in its desired position in the working space even upon sudden pressure loss. Thereby, even in this position, undesired shifting of the coupling device is avoided.

With the aid of this shift cylinder, therefore, it is ensured in constructively simple manner that the coupling device always maintains its current shift state upon pressure loss. In addition, the synchronizing body and the gear wheel always experience the same friction moment upon establishing the frictional fit even with different pressures of the working medium, whereby the coupling device can advantageously and securely be actuated by the feed pressure of the working medium anyway required for the operation of the hydraulic motors.

Further advantages arise by disposing at least one synchronizing element between the synchronizing body and the gear wheel, via which the frictional fit between the synchronizing body and the gear wheel can be indirectly generated. In other words, it is provided that the friction forces occurring upon shifting the coupling device into the first shift state are distributed to at least one additional synchronizing element, via which the frictional fit between the synchronizing body and the gear wheel is indirectly established. In this manner, the coupling device includes at least two additional friction surfaces of the synchronizing element, whereby greater torques can be accepted, greater rotation speed differences between the synchronizing body and the gear wheel are tolerable and the lifetime of the coupling device is advantageously extended. Preferably, the friction surfaces of the synchronizing element are also formed conically or correspondingly with the associated friction surfaces of the synchronizing body and/or the gear wheel. Basically, it can be provided that two, three, four or further synchronizing elements are disposed between the synchronizing body and the gear wheel, whereby the lifetime of the involved friction pairings can be additionally increased. Furthermore, it can be provided that at least one synchronizing element is disposed on the synchronizing body and/or on the gear wheel rotationally fixed and/or rotatable by at most ±25°.

In further development, additional installation space and cost savings are allowed in that the drive device includes only one pumping device, by means of which both hydraulic motors and/or the coupling device are to be supplied with working medium. Therein, it has proven particularly advantageous if the coupling device includes the above described shift cylinder and it is usable for shifting the coupling device between the first and the second shift position by corresponding pressurization with the working medium. In further development, additional installation space and cost savings are allowed in that the first and the second hydraulic motor are hydraulically connected in parallel. Moreover, in this manner, the first and the second hydraulic motor can be particularly simply supplied with working medium with only one pumping device.

In further development of the invention, it has proven advantageous if the synchronizing body has a further friction surface on its side facing away from the gear wheel, which can be brought into abutment on a corresponding friction surface of a case rotationally fixed with respect to the drive device. Hereby, the second hydraulic motor can be braked and/or fixed to the case via frictional fit with the coupling device shifted into the second shift state. Therein, it can be further provided that the synchronizing body and the case have toothings corresponding with each other, by means of which a form-fit connection between the synchronizing body and the case can additionally be established. This toothing too can be formed as a claw toothing in further development.

In further development of the invention, it has proven advantageous if the coupling device is formed to accelerate the second hydraulic motor at least to a preset minimum rotation speed upon shifting from the second shift state into the first shift state, preferably before establishing the frictional fit between the synchronizing body and the gear wheel. Hereby, the friction power arising upon engaging the second hydraulic motor can advantageously be reduced. This is in particular advantageous if the second hydraulic motor is to be coupled to the moved gear wheel from the rest because by the short-time swiveling out of the second hydraulic motor, the launch torque thereof does not or not alone have to be overcome by the friction pairing of synchronizing body-gear wheel.

A further aspect of the invention relates to a work machine, in particular a land-based, automotive work machine with a drive device according to any one of the preceding embodiments. The features arising from it and the advantages thereof can be gathered from the corresponding descriptions and correspondingly apply to the work machine.

A further aspect of the invention relates to a method for operating a drive device of an automotive work machine, wherein the drive device includes a first hydraulic motor coupled to a driven shaft coupled to an axle of the work machine for driving the work machine, a second hydraulic motor and a coupling device, by means of which the second hydraulic motor is coupled to the driven shaft for torque addition in a first shift state and is decoupled from the driven shaft in a second shift state. The coupling device in turn includes at least one synchronizing body with a conical friction surface coupled to the second hydraulic motor and a gear wheel with a corresponding friction surface movable relatively to the synchronizing body and coupled to the driven shaft. Within the scope of the method according to the invention, therein, it is provided that upon shifting the coupling device from the second into the first shift state, the synchronizing body and the gear wheel are moved relatively to each other, a possible rotation speed difference between the synchronizing body and the gear wheel is at least reduced and a frictional fit between the friction surface of the synchronizing body and the friction surface of the gear wheel is established. Furthermore, it is provided that upon shifting the coupling device from the first into the second shift state, the synchronizing body and the gear wheel are moved relatively away from each other and the frictional fit between the friction surface of the synchronizing body and the friction surface of the gear wheel is cancelled. The method according to the invention allows passage of the work machine over its entire speed range without interruption of the traction force, because the first hydraulic motor remains permanently engaged and provides a corresponding torque even during the shift operation. The second hydraulic motor is coupled in on demand and preferably with greater gear ratio than the first hydraulic motor and thereby provides its additional torque. From a certain speed of the work machine, the second hydraulic motor is decoupled in the above described manner in order to protect it from inadmissibly high rotation speeds. Therein, the drive device can be formed constructively particularly simple and in installation space saving manner and be correspondingly inexpensively manufactured. The stronger the friction surface of the synchronizing body is moved to the friction surface of the gear wheel, the higher the friction forces between the two friction surfaces become due to the conical configuration. Accordingly, possible rotation speed differences between the synchronizing body and the gear wheel are also at least reduced or completely compensated for at the latest upon effected frictional fit depending on the friction forces. By a greater actuation force, a correspondingly faster synchronization of the rotation speeds is achieved and a possibly existing rotation speed difference between the second hydraulic motor coupled to the synchronizing body and the rotating gear wheel is compensated for upon establishing the frictional fit. Further arising advantages can be gathered from the preceding descriptions, wherein advantageous developments of the drive device are to be considered as advantageous developments of the method and vice versa.

In an advantageous development of the invention, it is provided that upon shifting the coupling device from the second into the first shift state, toothings of the synchronizing body and the gear wheel corresponding with each other are engaged with each other and/or that upon shifting the coupling device from the first into the second shift state, the toothings of the synchronizing body and the gear wheel corresponding with each other are disengaged from each other. In other words, it is provided that the synchronizing body and the gear wheel are additionally coupled to each other via a form-fit connection at least upon established frictional fit in the first shift state of the coupling device. Hereby, particularly high torques of the second hydraulic motor can be reliably transmitted. As the toothing, for example, a so-called pretoothing can be used on the synchronizing body and/or gear wheel. A further advantage is in that the friction surfaces of the synchronizing body and the gear wheel are predominantly required only for short-time compensation for possible rotation speed differences. Therefore, the synchronizing body and the gear wheel can be particularly compactly designed. Thus, the advantages of a conventional toothing (form-fit connection, independent of pressure) are combined with those of a multi-disk clutch (engaging/disengaging even under load).

Further advantages arise if the coupling device includes a shift cylinder, by means of which the synchronizing body and the gear wheel are moved relatively to each other. Hereby, simple shifting of the coupling device between the first and the second shift state is allowed. With the aid of the shift cylinder, therein, the synchronizing body and the gear wheel are moved relatively to each other. Basically, the shift cylinder can be mechanically, electrically, pneumatically, magnetically and/or hydraulically operated.

In a further advantageous development of the invention, it is provided that the coupling device accelerates the second hydraulic motor at least to a preset minimum rotation speed upon shifting from the second shift state into the first shift state, preferably before establishing the frictional fit between the synchronizing body and the gear wheel. Hereby, the friction power arising upon engaging the second hydraulic motor is advantageously reduced. This is in particular advantageous if the second hydraulic motor is to be coupled to the moved gear wheel from the rest, since by the short-time swiveling out of the second hydraulic motor, the launch torque thereof does not or not alone have to be overcome by the friction pairing of synchronizing body-gear wheel.

BRIEF DESCRIPTION OF THE DRAWINGS

Further features of the invention are apparent from the claims, the embodiments as well as based on the drawings. The features and feature combinations mentioned above in the description as well as the features and feature combinations mentioned below in the embodiments are usable not There show:

DETAILED DESCRIPTION OF THE INVENTION

Figure 1:
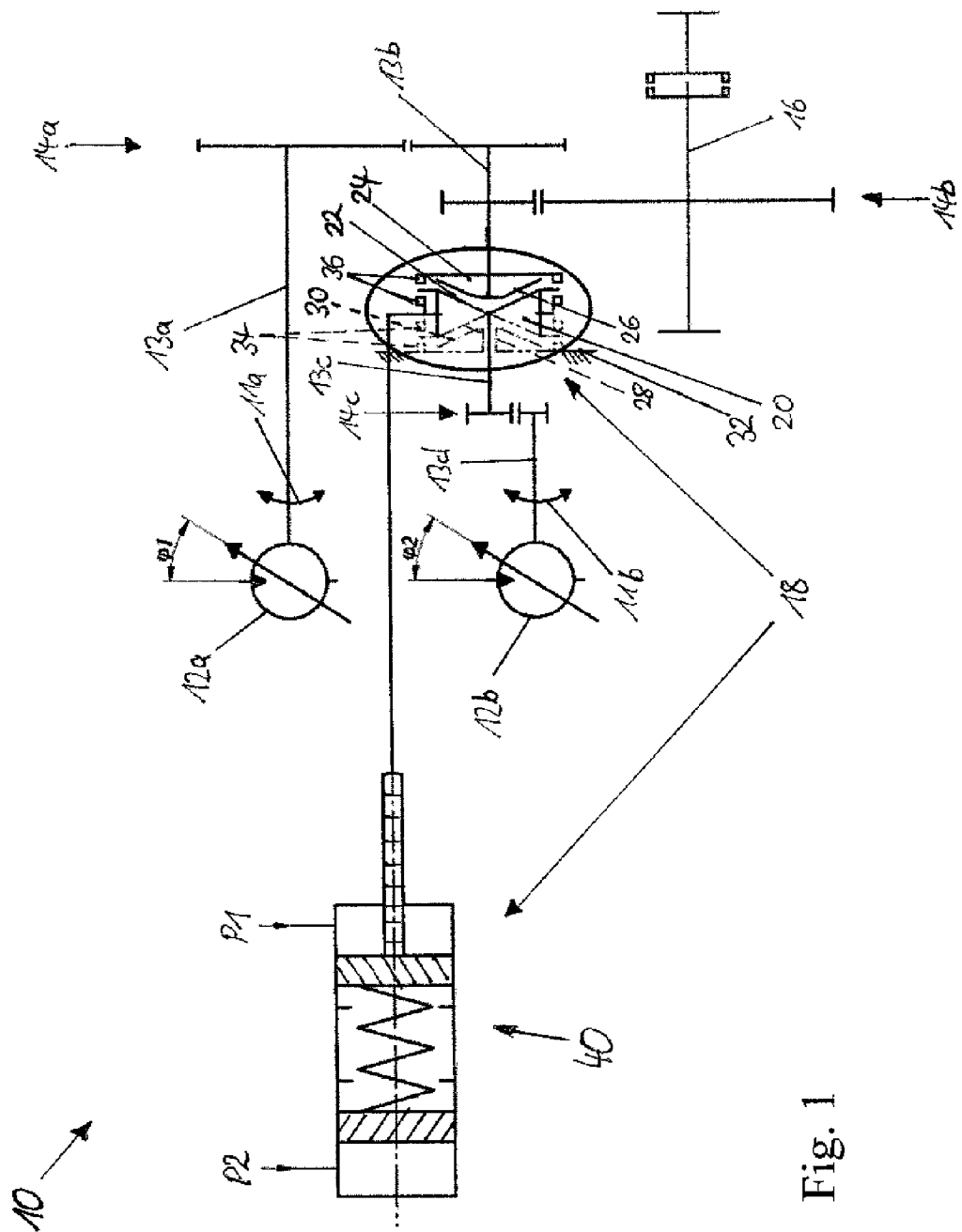
FIG. 1 a schematic illustration of a drive device according to the invention.

FIG. 1 shows a schematic illustration of a drive device 10 according to the invention for a land-based, automotive work machine (not shown). The drive device 10 includes a first hydraulic motor 12a, which is drivable by means of hydraulic fluid and is coupled to a driven shaft 16 via a shaft 13a, a gear pairing 14a, a shaft 13b and a gear pairing 14b. Furthermore, the drive device 10 includes a second hydraulic motor 12b drivable by means of hydraulic fluid and a coupling device 18, by means of which the second hydraulic motor 12b can be coupled to the driven shaft 16 for torque addition in a first shift state and can be decoupled from the driven shaft 16 in a second shift state. The hydraulic motor 12a has a working range, which does not allow covering the entire drive range of the work machine of high traction force at small traveling speeds up to very high traveling speeds. Therefore, the first hydraulic motor 12a is provided for fast speeds and lower traction forces and permanently coupled to the driven shaft 16 with lower gear ratio. The second hydraulic motor 12b can be engaged with larger gear ratio for slow speeds and great traction forces. In a manner known per se, the drive of the work machine is effected indirectly or directly via the driven shaft 16. With the aid of the coupling device 18 explained in more detail below, the work machine is able to pass through the entire speed range without interruption of the traction force, wherein the first hydraulic motor 12a provides a corresponding torque even during shifting between the first and the second shift state of the coupling device 18.

For driving the first hydraulic motor 12a and the second hydraulic motor 12b, both hydraulic motors 12a, 12b are to be supplied with the hydraulic fluid by means of only one common pumping device (not depicted) of the drive device 10. Thereby, the drive device 10 has a low number of parts, a low weight and a low installation space requirement and can accordingly be inexpensively manufactured. As it is identifiable on the two directional arrows 11a, 11b, the direction of rotation of the two hydraulic motors 12a, 12b is reversible such that the work machine can for example be moved forward and rearward.

The coupling device 18 in turn has at least one synchronizing body 20 with a conical friction surface 22 coupled to the second hydraulic motor 12b and presently formed as a synchronizing ring as well as a gear wheel 24 with a corresponding friction surface 26 movable relatively to the synchronizing body 20 and coupled to the driven shaft 16. Presently, the gear wheel 24 is rotationally fixedly connected to the shaft 13b, while the synchronizing body 20 is coupled to the second hydraulic motor 12b via a shaft 13c, a gear pairing 14c and a shaft 13d.

An alternative embodiment of the coupling device 18 is indicated with dashed lines, according to which the synchronizing body 20 has a further friction surface 28 on its side facing away from the gear wheel 24, which can be brought into abutment on a corresponding friction surface 30 of a case 32 rotationally fixedly held on the work machine. Hereby, the second hydraulic motor 12b can be braked or fixed to the case 32 via frictional fit with the coupling device 18 shifted into the second shift state. Therein, it can be further provided that the synchronizing body 20 and the case 32 have toothings 34 corresponding with each other, by means of which a form-fit connection between the synchronizing body 20 and the case 32 can be established. In further development, the toothings 34 can be formed as claw toothings.

For coupling the second hydraulic motor 12b to the driven shaft 16, that is upon shifting the coupling device 18 into the first shift state, the synchronizing body 20 is moved towards the axially fixed gear wheel 24, thereby establishing a frictional fit between the friction surface 22 of the synchronizing body 20 and the friction surface 26 of the gear wheel 24. At the same time, a possible rotation speed difference between the synchronizing body 20 or the shaft 13c and the gear wheel 24 or the shaft 13b is reduced or completely compensated for upon establishing the frictional fit. In order to keep the arising friction power as low as possible, the mechanical synchronization is supported by a simultaneous or temporally advanced hydraulic synchronization. To this, the second hydraulic motor 12b is temporarily swiveled out ($\phi$2) upon or before contacting the friction surfaces 22, 26 such that it reaches a certain minimum rotation speed. Subsequently, the second hydraulic motor 12b can be engaged with lower friction power in the above described manner and provide its additional torque. Hereby, the friction surfaces 22, 26 are preserved because they are only required for short-time compensation for low rotation speed difference upon engaging. The friction surfaces 22, 26 and the synchronizing body 20 and the gear wheel 24, respectively, can therefore be very small designed, whereby the coupling device 18 can be correspondingly compactly and inexpensively presented.

For decoupling the second hydraulic motor 12b from the driven shaft 16, that is upon shifting the coupling device 18 into the second shift state, the synchronizing body 20 is moved away from the gear wheel 24, whereby the frictional fit between the friction surface 22 of the synchronizing body 20 and the friction surface 26 of the gear wheel 24 is again cancelled. Depending on the configuration of the coupling device 18, the second hydraulic motor 12b can subsequently optionally be fixed to the case 32 in the above described manner.

The synchronizing body 20 and the gear wheel 24 include toothings 36 corresponding with each other, wherein the toothings 36 are engaged with each other with the second hydraulic motor 12b coupled to the driven shaft 16, that is in the first shift state of the coupling device 18, and also establish a form-fit connection in addition to the friction-fit connection. Therein, the toothings 36 are presently formed as claw toothing with undercut teeth. In the first shift state, the force transmission is therefore positively effected with the aid of the toothings 36, which maintain the coupling device 18 always in the closed first shift state even under load or upon pressure loss.

In the shown embodiment, the gears of the gear pairing 14a include 37 teeth (gear on shaft 13a) and 31 teeth (gear on shaft 13b), wherein a gear ratio of i=0.838 results. The gears of the gear pairing 14b include 21 teeth (gear on shaft 13b) and 49 teeth (gear on driven shaft 16), respectively, whereby a gear ratio of i=2.333 results. Finally, the gears of the gear pairing 14c include 19 teeth (gear on shaft 13d) and 52 teeth (gear on shaft 13c), whereby a gear ratio of i=2.737 results. The gear including 37 teeth of the gear pairing 14a is therefore in a gear ratio of i=3.266 to the gear including 19 teeth of the gear pairing 14c. The gear including 37 teeth of the gear pairing 14a is in a gear ratio of i=1.955 to the gear including 49 teeth of the gear pairing 14b. Finally, the gear including 19 teeth of the gear pairing 14c is in a gear ratio of i=6.386 to the gear including 49 teeth of the gear pairing 14b. However, it is to be emphasized that these are only non limiting examples for possible gear ratios and that varying gear ratios can also be provided.

Figure 2:
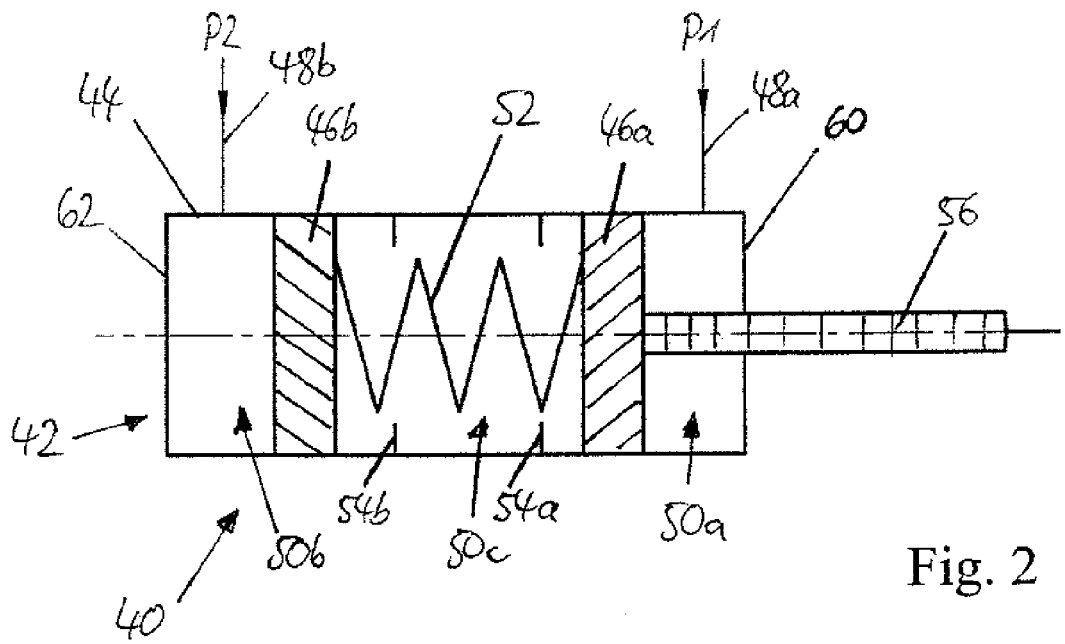
FIG. 2 a schematic longitudinal section view of a shift cylinder of the drive device shown in FIG. 1.

In order to move the synchronizing body 20 and the gear wheel 24 relatively to each other, the coupling device 18 includes a shift cylinder 40, which will be explained in more detail below based on FIG. 2, which shows a schematic longitudinal section view of the shift cylinder 40. The shift cylinder 40 includes a cylinder element 44 having a working space 42 as well as a first piston 46a and a second piston 46b, which are received in the working space 42 displaceable relative to it. By the pistons 46a, 46b, the working space 42 is divided in a first working chamber 50a being able to be loaded with a working medium via a first connection 48a of the shift cylinder 40, a second working chamber 50b being able to be loaded with a working medium via a second connection 48b of the shift cylinder 40 and a third working chamber 50c disposed between the first and the second working chamber 50a, 50b. Furthermore, the shift cylinder 40 includes a spring element 52 formed as a compression spring supportable on the first piston 46a on the one hand and on the second piston 46b on the other hand, by means of which the pistons 46a, 46b can be mutually loaded with force.

Furthermore, a first stop 54a of the shift cylinder 40 is associated with the first piston 46a, by means of which movement of the first piston 46a towards the second piston 46b is limited. A second stop 54b of the shift cylinder 40 is associated with the second piston 46b, by means of which movement of the second piston 46b towards the first piston 46a is limited. The first piston 46a is connected to a push rod 56 guided through the housing of the shift cylinder 40, which can be moved along with the first piston 46a. Further, the push rod 56 is coupled to the synchronizing body 20 of the coupling device 18 such that by axially moving the push rod 56, the synchronizing body 20 can be moved along relative to the gear wheel 24 in axial direction of the shafts 13c and 13d, respectively.

For closing the coupling device 18, i.e. for shifting into the first shift state, the second working chamber 50b is loaded with hydraulic fluid such that a pressure P2 exists in the second working chamber 50b, which acts on the second piston 46b. Depending on an area of the second piston 46b, on which the pressure P2 acts, a second force corresponding to the second piston 46b results from this pressure. Therein, this second force is higher than a spring force optionally acting on the second piston 46b by the spring element 52 as a result of its support on the first piston 46a as well as greater than a first force corresponding to the first piston 46a, which optionally counteracts the second force as a result of loading the first working chamber 50a with hydraulic fluid with a pressure P1. By the second force, the second piston 46b is moved towards the first piston 46a. The second piston 46b moves until it comes into supporting abutment on the second stop 54b. Thereby, the spring element 52 is stressed such that the first piston 46a experiences a defined force independent of the pressure P2, which originates from the stressed spring element 52. With this force, the first piston 46a is moved away from the second piston 46b, thereby moving the friction surface 22 towards the friction surface 26.

If the rotation speeds of the shafts 13c and 13b are synchronized, the first piston 46a moves further up to its final position in the working space 42, for example until it is supported on an end wall 60 of the cylinder element 44 bounding the working space 42 and the first working chamber 50a. Upon sudden pressure drop of the pressure P2, the first piston 46a remains in its relative position to the working space 42, while the second piston 46b is moved by the spring force of the spring element 52 until the spring element 52 is relaxed. However, the coupling device 18 remains closed. This is supported by the claw toothing, by which the coupling device 18 always at least substantially maintains its current shift state even upon pressure loss.

A further advantage of the shift cylinder 40 is in that even with different pressures P1 and P2, the same friction moment is at least substantially always present upon closing (engaging) the coupling device 18 and acts on the coupling device 18. Therefore, the coupling device 18 can be advantageously and securely closed by a so-called feed trough of the drive device 10. Since at least substantially upon shifting the coupling device 18 the same constant force is always present on the push rod 56 even with different pressures P1 and P2, at least substantially always the same friction and synchronizing behavior of the coupling device 18 exists. Thereby, the hydraulic motors 12a, 12b as well as both working chambers 50a, 50b can be supplied with hydraulic fluid by a common pumping device, wherein variation of the feed pressure of the hydraulic fluid does not result in variation of the friction moment and thereby the friction power of the coupling device 18. This is in particular realized by the spring loading of the first piston 46a, wherein it is at the same time allowed by the shift cylinder 40 that the relative position of the first piston 46a to the working space 42 at least substantially does not change upon undesired and sudden pressure loss.

For opening the coupling device 18, i.e. for shifting into the second shift state, the first working chamber 50a is loaded with hydraulic fluid such that the pressure P1 exists in the first working chamber 50a. This pressure P1 acts on the first piston 46a. Depending on the area of the first piston 46a, on which the pressure P1 acts, the first force results from the pressure P1, which acts towards the second piston 46b. Therein, the first force is greater than a force optionally acting on the first piston 46a opposite to the first force by the spring element 52 and greater than the second force, wherein the force acting by the spring element 52 is greater than the second force. By moving the first piston 46a towards the second piston 46b, the spring element 52 is again stressed such that a spring force acts on the second piston 46b by the spring element 52. By this spring force, the second piston 46b is moved towards a further end wall 62 of the cylinder element 44, by which the working space 42 and the second working chamber 50b are partially bounded. The axial extension or the length of the spring element 52 as well as of the cylinder element 44 and thereby of the working space 42 are for example dimensioned such that with opened coupling device 18 a spring force does no longer act on the first piston 46a. Thus, a sudden pressure loss of the pressure P1 either does not result in undesired movement of the first piston 46a relative to the working space 42. Undesired shifting of the coupling device 18 is therefore made impossible. In other words, thus, neither the pressure loss of the pressure P2 nor the pressure loss of the pressure P1 have any influence on the shift state of the coupling device 18 and thus on the operating state of the work machine. Hereby, the shift cylinder 40 substantially differs from conventional spring-loaded pistons since they can suddenly change their position upon pressure loss, which may result in undesired operating states, for example in uncontrolled runaway of the second hydraulic motor 12b.

Figure 3:
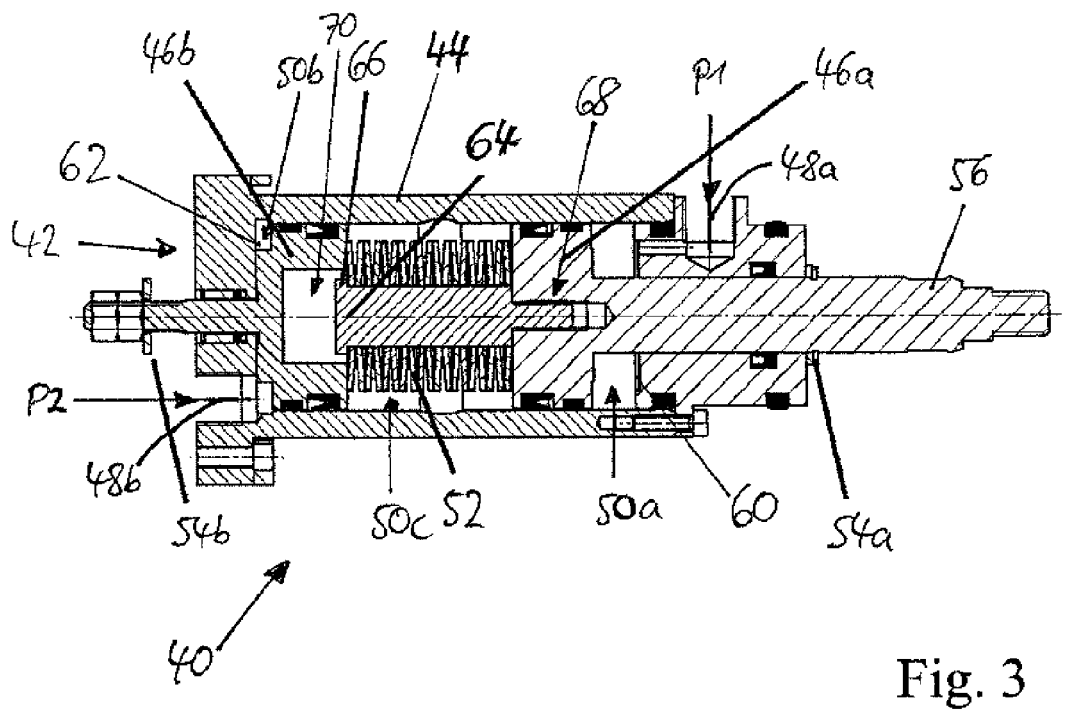
FIG. 3 a schematic longitudinal section view of a further embodiment of the shift cylinder.

FIG. 3 shows a schematic longitudinal section view of a further embodiment of the shift cylinder 40. Unlike the preceding embodiment, the spring element 52 is biased on the first piston 46a such that it can only move in its operating range. To this, the shift cylinder 40 according to FIG. 3 includes a piston rod 64 with a collar 66. The first piston 46*a* has a receptacle 68 for example configured as a bore, in which an end region of the piston rod 64 opposing the collar 66 is received, for example screwed in, press-fitted or movably supported.

The not required length range between completely relaxed spring element 52 and that length required for completely engaging the coupling device 18, is biased at or on the piston rod 64 and the first piston 46*a*, wherein the spring element 52 supports itself on the collar 66 on the one hand and on the piston 46*a* on the other hand in the biased state. Unlike the first embodiment, the shift cylinder 40 can be designed shorter hereby, whereby further installation space savings result. A further difference to the first embodiment is in that the stops 54*a*, 54*b* of the pistons 46*a*, 46*b* are disposed outside of the cylinder element 44, whereby subsequent adjustability of the spring force of the spring element 52 is allowed.

With the coupling device 18 shifted into the first shift state, that is with engaged second hydraulic motor 12*b*, the first piston 46*a* abuts on the end wall 60, wherein a residual spring force still acts via the second piston 46*b* and the biased spring element 52. The second piston 46*b* abuts on the second stop 54*b*. In case of pressure loss of the pressure P2 in the second working chamber 50*b*, the second piston 46*b* does not move the entire path back until complete relaxation of the spring element 52 and abutment of the second piston 46*b* on the end wall 62, but only a relatively short path until the spring element 52 abuts on the collar 66. The spring force is maintained by the piston rod 64 and the collar 66.

The cylinder element 44 is dimensioned such that the second piston 46*b* stays without spring force by the spring element 52 with the coupling device 18 shifted into the second shift state, that is with disengaged second hydraulic motor 12*b*. Due to the bias of the spring element 52, this position is already reached before complete relaxation of the spring element 52 such that the cylinder element 44 can be correspondingly shorter formed compared to the preceding example. As is further recognizable in FIG. 3, the second piston 46*b* has a receptacle 70, in which the piston rod 64 can be received at least in partial areas. Hereby too, the cylinder element 44 can be correspondingly shorter formed compared to the preceding example.

Principally, the described shift cylinder 40 is not only suitable for the above described coupling device 18, but can be used independently of it for example for transmissions with multi-disk clutches or other applications, in which a clutch with friction elements is to be actuated always with the same force even with different pressure relations. Therein, it is basically advantageous if the pistons 46*a*, 46*b* are dimensioned such that they sufficiently tension the spring element 52 even with the lowest pressure difference $\Delta P=|P1-P2|$ to be expected and can be moved between their respective final positions in all conceivable operating states.

The invention claimed is:

1. A drive device (10) for an automotive work machine, comprising:
    a first hydraulic motor (12*a*) coupled to a driven shaft (16);
    a second hydraulic motor (12*b*); and
    a coupling device (18), by means of which the second hydraulic motor (12*b*) can be coupled to the driven shaft (16) for torque addition in a first shift state and can be decoupled from the driven shaft (16) in a second shift state, wherein the coupling device (18) includes:
        at least one synchronizing body (20) with a conical friction surface (22) coupled to the second hydraulic motor (12*b*); and
        a gear wheel (24) with a corresponding friction surface (26) movable relatively to the synchronizing body (20) and coupled to the driven shaft (16), and wherein
        upon coupling the second hydraulic motor (12*b*) to the driven shaft (16), a possible rotation speed difference between the synchronizing body (20) and the gear wheel (24) can be at least reduced and a frictional fit between the friction surface (22) of the synchronizing body (20) and the friction surface (26) of the gear wheel (24) can be established by relatively moving the synchronizing body (20) and the gear wheel (24) to each other; and
        upon decoupling the second hydraulic motor (12*b*) from the driven shaft (16), the frictional fit between the friction surface (22) of the synchronizing body (20) and the friction surface (26) of the gear wheel (24) can be cancelled by relatively moving the synchronizing body (20) and the gear wheel (24) away from each other,
        wherein the coupling device (18) is formed to accelerate the second hydraulic motor (12*b*) at least to a preset minimum rotation speed upon shifting from the second shift state into the first shift state before establishing the frictional fit between the synchronizing body (20) and the gear wheel (24).

2. The drive device (10) according to claim 1, wherein the synchronizing body (20) and the gear wheel (24) include toothings (36) corresponding with each other, and wherein the toothings (36) are engaged with each other at least with the second hydraulic motor (12*b*) coupled to the driven shaft (16).

3. The drive device (10) according to claim 2, wherein the coupling device (18) is formed such that intermeshing of the toothings (36) upon exceeding a preset rotation speed difference between the synchronizing body (20) and the gear wheel (24) is made impossible.

4. The drive device (10) according to claim 2, wherein the toothings (36) are formed as claw toothing with undercut teeth.

5. The drive device (10) according to claim 1, wherein the coupling device (18) includes a shift cylinder (40), by means of which the synchronizing body (20) and the gear wheel (24) are movable relatively to each other.

6. The drive device (10) according to claim 5, wherein the shift cylinder (40) includes:
    a cylinder element (44) having a working space (42);
    a first and a second piston (46*a*, 46*b*) received in the working space (42) displaceable relative to it, by which the working space (42) is divided in a first working chamber (50*a*) being able to be loaded with a working medium via a first connection (48*a*) of the shift cylinder (40), a second working chamber (50*b*) being able to be loaded with a working medium via a second connection (48*b*) of the shift cylinder (40), and a third working chamber (50*c*) disposed between the first and the second working chamber (50*a*, 50*b*); and
    at least one spring element (52) being able to be supported on the first piston (46*a*) on the one hand and on the second piston (46*b*) on the other hand, by means of which the pistons (46*a*, 46*b*) can be mutually loaded with force, wherein
    a first stop (54*a*) of the shift cylinder (40) is associated with the first piston (46*a*), by means of which movement of the first piston (46*a*) towards the second piston (46*b*) is limited, and a second stop (54*b*) of the shift cylinder (40) is associated with the second piston (46*b*), by means of which movement of the second piston (46*b*) towards the first piston (46*a*) is limited.

7. The drive device (10) according to claim 1, wherein between the synchronizing body (20) and the gear wheel (24), at least one synchronizing element is disposed, via which the frictional fit between the synchronizing body (20) and the gear wheel (24) can be indirectly generated.

8. The drive device (10) according to claim 1, wherein the drive device (10) includes only one pumping device, by means of which both hydraulic motors (12*a*, 12*b*) and/or the coupling device (18) are to be supplied with working medium and/or that the first and the second hydraulic motor (12*a*, 12*b*) are hydraulically connected in parallel.

9. The drive device (10) according to claim 1, wherein the synchronizing body (20) has a further friction surface (28) on its side facing away from the gear wheel (24), which can be brought into abutment on a corresponding friction surface (30) of a case (32) rotationally fixed with respect to the drive device (10).

10. The drive device (10) according to claim 1, wherein the device is employed in a land-based, automotive work machine.

11. A method for operating a drive device (10) of an automotive work machine, comprising the steps of:
    providing a drive device (10) including:
        a first hydraulic motor (12*a*) coupled to a driven shaft (16) coupled to an axle of the work machine for driving the work machine;
        a second hydraulic motor (12*b*); and
        a coupling device (18), by means of which the second hydraulic motor (12*b*) is coupled to the driven shaft (16) for torque addition in a first shift state and is decoupled from the driven shaft (16) in a second shift state, wherein the coupling device (18) includes:
            at least one synchronizing body (20) with a conical friction surface (22) coupled to the second hydraulic motor (12*b*); and
            a gear wheel (24) with a corresponding friction surface (26) movable relatively to the synchronizing body (20) and coupled to the driven shaft (16), wherein
    upon shifting the coupling device (18) from the second into the first shift state, moving the synchronizing body (20) and the gear wheel (24) relatively to each other, a possible rotation speed difference between the synchronizing body (20) and the gear wheel (24) is at least reduced and a frictional fit between the friction surface (22) of the synchronizing body (20) and the friction surface (26) of the gear wheel (24) is established; and
    upon shifting the coupling device (18) from the first into the second shift state, moving the synchronizing body (20) and the gear wheel (24) relatively away from each other and the frictional fit between the friction surface (22) of the synchronizing body (20) and the friction surface (26) of the gear wheel (24) being cancelled,
    wherein the coupling device (18) accelerates the second hydraulic motor (12*b*) at least to a preset minimum rotation speed upon shifting from the second shift state into the first shift state before establishing the frictional fit between the synchronizing body (20) and the gear wheel (24).

12. The method according to claim 11, further comprising the step of:
    upon shifting the coupling device (18) from the second into the first shift state, engaging with each other toothings (36) of the synchronizing body (20) and the gear wheel (24), corresponding with each other and/or that upon shifting the coupling device (18) from the first into the second shift state the toothings (36) of the synchronizing body (20) and the gear wheel (24) corresponding with each other are disengaged from each other.

13. The method according to claim 11, wherein the coupling device (18) includes a shift cylinder (40), by means of which the synchronizing body (20) and the gear wheel (24) are moved relatively to each other.

\* \* \* \* \*